March 24, 1959 E. R. SMITH 2,878,685
POWER ACTUATOR WITH PILOT CONTROL
Filed March 26, 1957 6 Sheets-Sheet 3

INVENTOR.
EDWIN R. SMITH.
BY Chas. T. Hawley
ATT'Y.

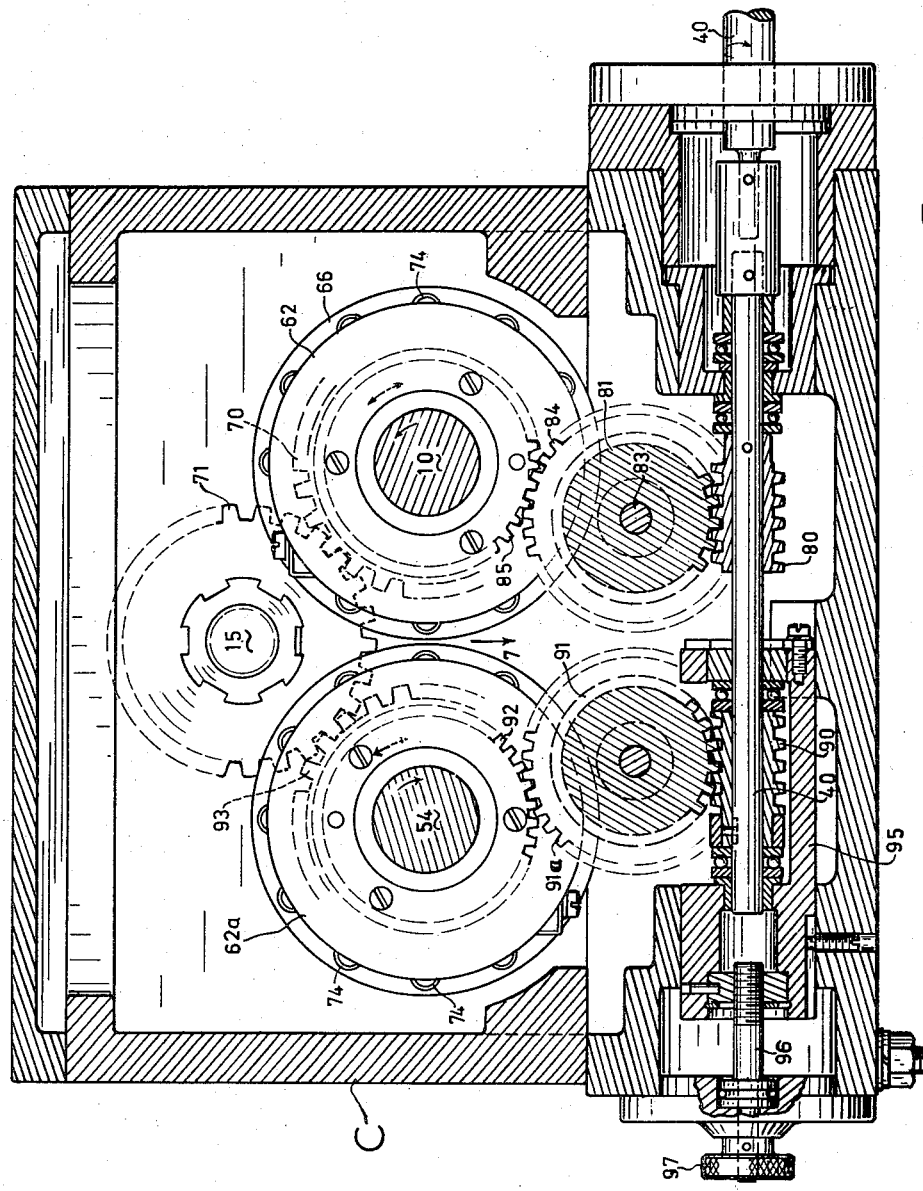

March 24, 1959         E. R. SMITH         2,878,685

POWER ACTUATOR WITH PILOT CONTROL

Filed March 26, 1957         6 Sheets-Sheet 5

INVENTOR.
EDWIN R. SMITH.
BY Chas. T. Hawley
ATT'Y.

March 24, 1959     E. R. SMITH     2,878,685
POWER ACTUATOR WITH PILOT CONTROL
Filed March 26, 1957

INVENTOR.
EDWIN R. SMITH.

United States Patent Office 2,878,685
Patented Mar. 24, 1959

2,878,685
POWER ACTUATOR WITH PILOT CONTROL

Edwin R. Smith, Seneca Falls, N.Y., assignor to Seneca Falls Machine Company, Seneca Falls, N.Y., a corporation of Massachusetts Application March 26, 1957, Serial No. 648,582

1 Claim. (Cl. 74—388)

This invention relates to a power actuator or servo-motor by which a continuously moving power member and a member to be driven may be operatively associated by the functioning of a relatively small pilot or control device.

In the preferred construction, a power shaft is continuously rotated from any convenient source of power and is made effective to turn an output shaft when so determined by the pilot or control device.

It is the general object of my invention to provide improved control means by which the power shaft may be selectively rendered operative or inoperative with respect to the output shaft and under the control of the pilot device.

I also provide an improved construction in which a continuously rotated power shaft may be selectively connected to turn the output shaft in either direction under pilot control.

My invention further relates to arrangements and combinations of parts which will be hereinafter described and more particularly pointed out in the appended claim.

A preferred form of the invention is shown in the drawings, in which

Fig. 4 is a sectional end elevation, looking as indicated by the line 4—4 in Fig. 1;

Figure 1:
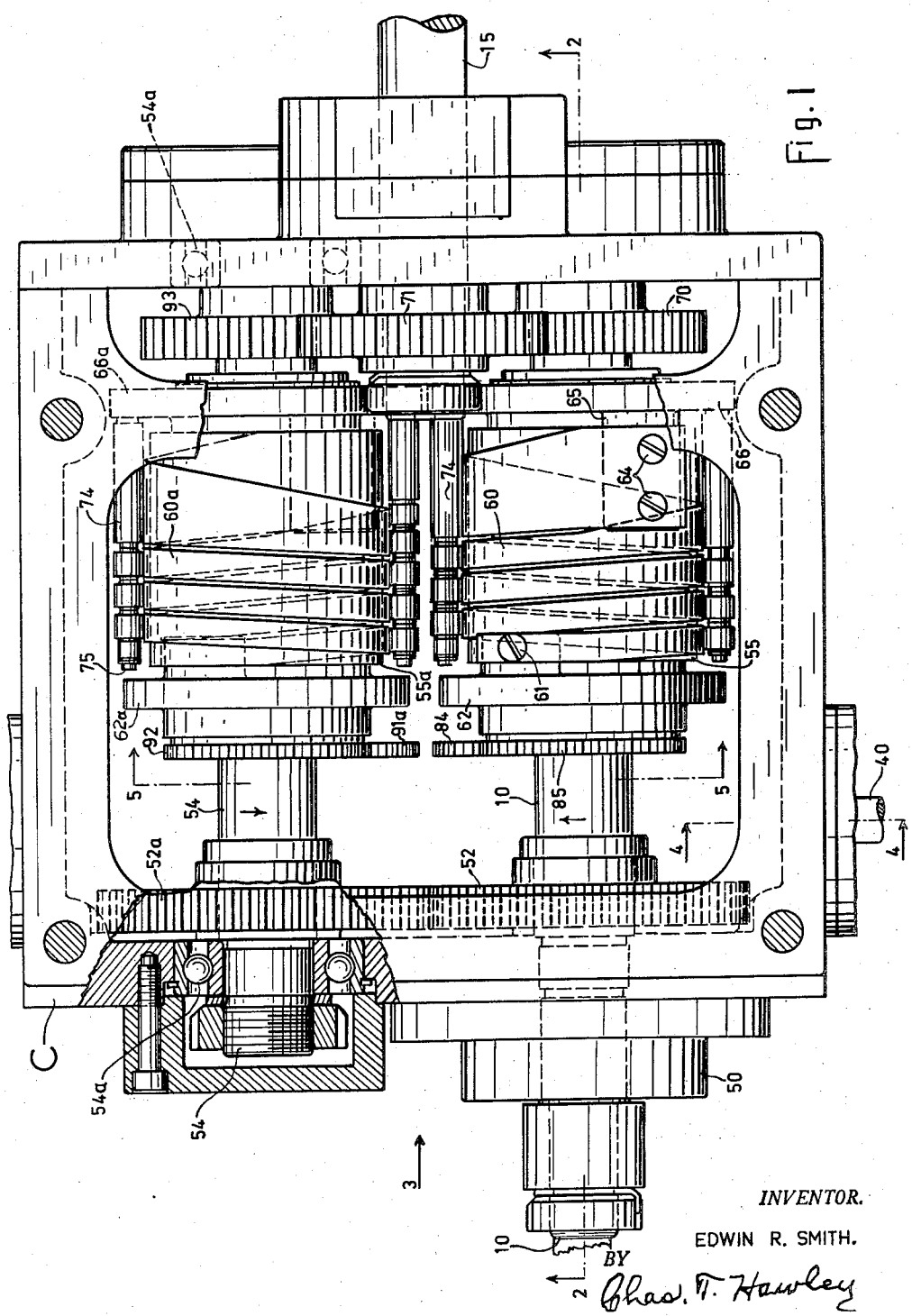
Fig. 1 is a plan view of my improved power actuator, partly in section.

Referring to the drawings, my improved power actuator in its preferred form comprises a casing C supporting an input or power shaft 10 which is continuously rotated by a motor M (Fig. 8) through a pinion 11 and gear 12, or which may be rotated from any other convenient source of power. An output shaft 15 is also mounted in the casing C and is normally stationary, but rotates when coupled to the power shaft 10 by the action of the control device to be described.

In the preferred form, the output shaft 15 may be selectively rotated in either direction as determined by the control device, but for some purposes, rotation of the ouput shaft in a single direction only has utility.

In the illustrative diagram (Fig. 8), the invention is shown as controlling the transverse position of a lathe tool T with respect to a rotated piece of work W, as in a contour lathe. The tool T is mounted on a cross slide 20, slidable crosswise on a carriage 22, which is moved longitudinally of the work on guideways 23 and 24.

A pattern plate P is mounted in fixed position and co-acts with a detector or follower 25 pivoted at 26a on the cross slide 20 and having an insulated index arm 26 connected to a line wire L.

The free end of the arm 26 makes selective contacts with terminals 30 and 31 which are connected to a relatively small control motor M' through wires 32 and 33. The motor M' is also connected to a second line wire L' and is of the reversible type which will be rotated clockwise or anti-clockwise, according as one or the other of the contacts 30 and 31 is engaged by the arm 26 under control of the pattern plate P.

The motor M' may be connected through reduction gearing G to a control shaft 40 rotatably mounted in a suitable bearing secured to the front of the casing C. The output shaft 15 is shown as provided with a pinion 42 engaging a rack 44 mounted on the carriage 22. The carriage 22 may thus be adjusted toward or away from the work W.

The operation of this illustrative mechanism may be briefly described as follows:

As the carriage 22 is moved longitudinally along the guideways 23 and 24, the detector 25 follows the contour of the fixed pattern plate P. As the contour changes, the arm 26 swings to the right or left to engage one or the other of the contacts 30 and 31. This causes the motor M' to rotate the control shaft 40 either clockwise or anti-clockwise. This movement of the shaft 40 then causes the power shaft 10 to rotate the output shaft 15 and pinion 42 through mechanism to be described, thus moving the tool T toward or away from the work W under the control of the pattern plate P, detector 25 and motor M'.

Figure 8:
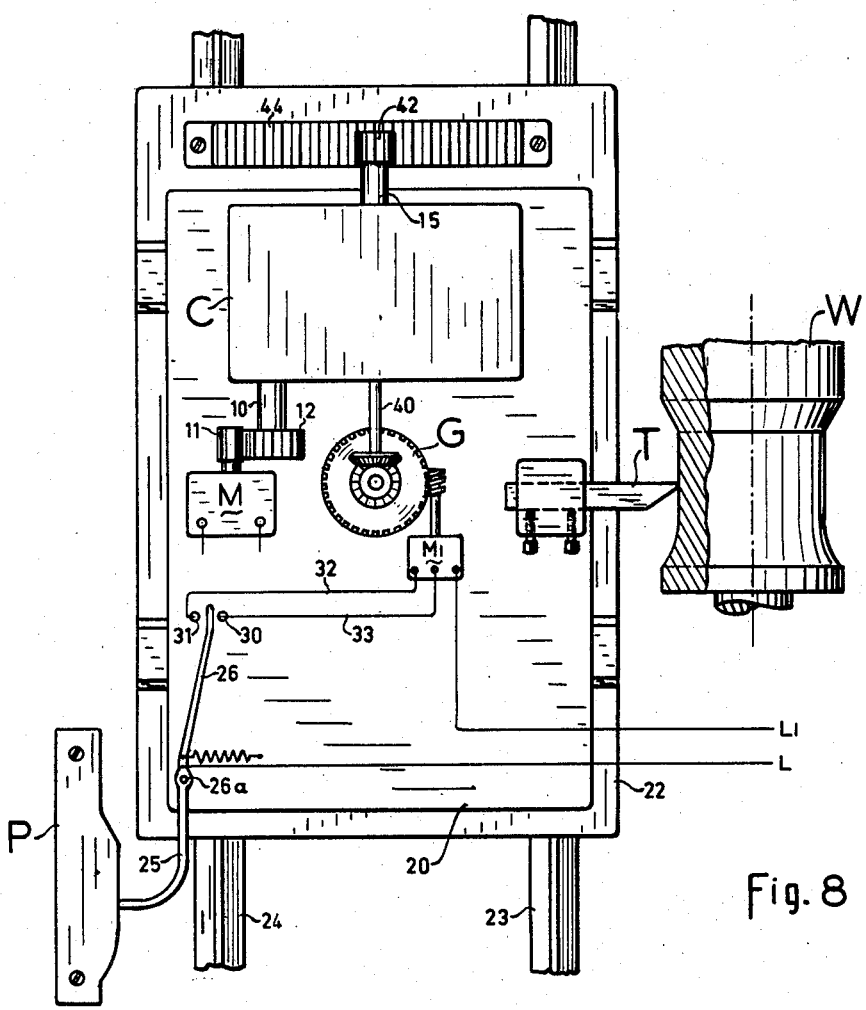
Fig. 8 is a diagrammatic view, illustrating the application of my invention to contour lathe operation.

It will be understood that the application of the invention shown in Fig. 8 and above described is illustrative only, and that the invention is well adapted for more general application.

Having made clear a desired result to be obtained by use of my improved power actuator, the details of construction of the power actuator will now be described.

Figure 2:
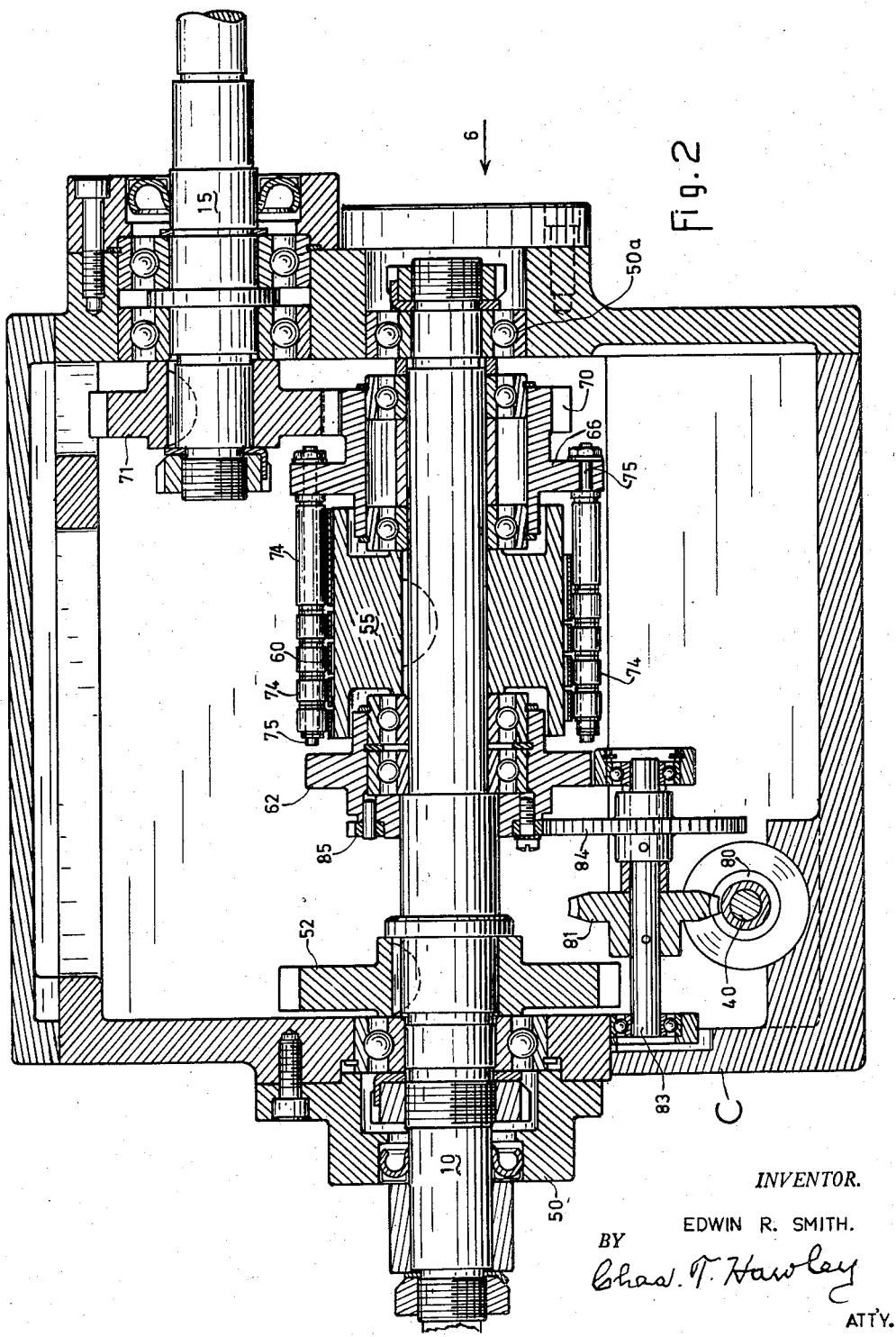
Fig. 2 is a sectional front elevation, taken along the line 2—2 in Fig. 1.
Figure 3:
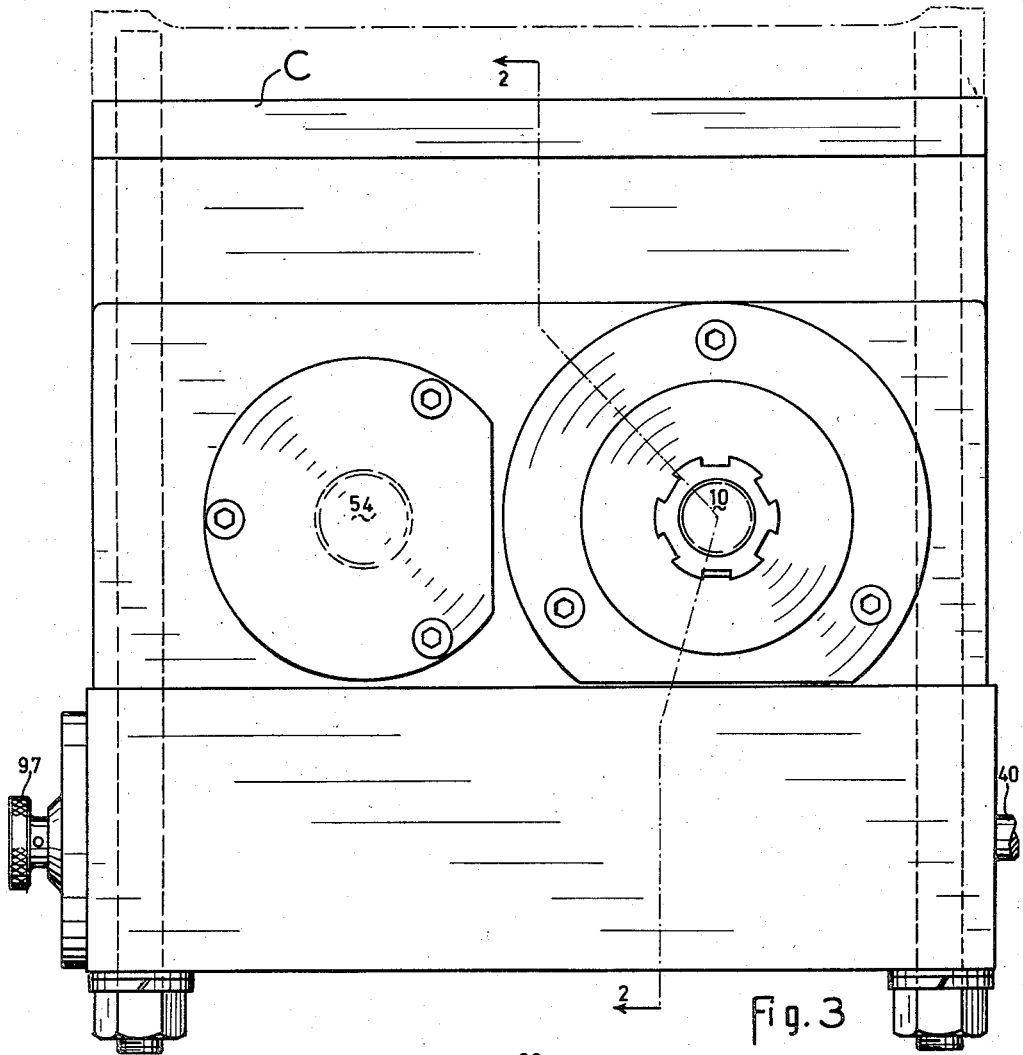
Fig. 3 is a left-hand end elevation, looking in the direction of the arrow 3 in Fig. 1.

Referring particularly to Figs. 1 and 2, the power shaft 10 is mounted in a bearing 50 fixed to the left-hand end of the casing C. The shaft 10 supports and rotates a large gear 52 (Fig. 2) which meshes with and drives a second and similar gear 52a (Fig. 1) mounted on a second and freely-rotatable shaft 54. Drums 55 and 55a are fixed on the shafts 10 and 54. Suitable bearings 54a for the shaft 54 (Fig. 1) and a second bearing 50a for the shaft 10 (Fig. 2) are indicated.

The two shafts 10 and 54 and the drums 55 and 55a are continuously rotated by the motor M in opposite directions and commonly but not necessarily at equal speeds.

Figure 5:
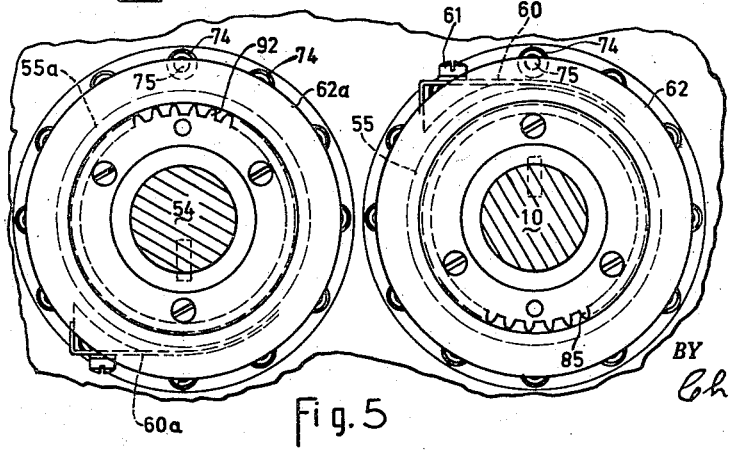
Fig. 5 is a sectional end elevation of certain parts, taken along the line 5—5 in Fig. 1.
Figure 6:
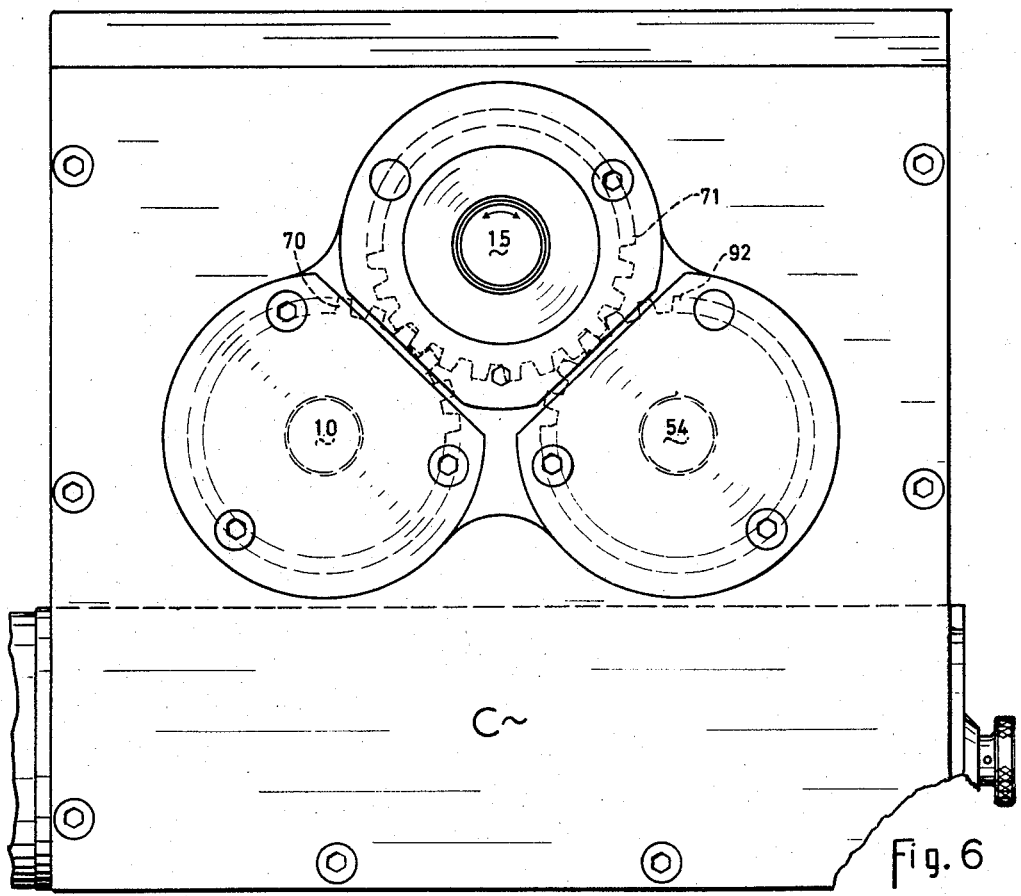
Fig. 6 is a right-hand end elevation, looking in the direction of the arrow 6 in Fig. 2.

A spiral band 60 (Fig. 1) is loosely mounted on the drum 55, and its left-hand end is secured by a screw 61 to an input hub 62 (Figs. 2 and 5) which is freely rotatable on the shaft 10.

The opposite or right-hand end of the band 60 is secured by screws 64 (Fig. 1) to a bracket 65 secured to the side of an output hub and disc 66 (Fig. 2) which is also loosely mounted on the shaft 10. The hub 66 is connected by a gear 70 to a gear 71 fixed to the output shaft 15 previously described. The gears 70 and 71 are commonly equal.

A plurality of sleeves 74 are mounted in peripherally-spaced relation (see Fig. 4) on studs 75 (Fig. 2) fixed in the disc 66. These sleeves 74 form an open roller cage which limits the outward expansion of the band 60.

The control shaft 40 (Fig. 4) is mounted in bearings fixed in the lower part of the casing C, and is connected for rotation in a selected direction by the control motor M' shown in Fig. 8.

A worm 80 is mounted on the control shaft 40 and engages a worm wheel 81 (Fig. 2) mounted on a shaft 83, which shaft also supports and rotates a gear 84, which in turn engages a gear 85 on the input hub 62.

The control shaft 40 also carries a second worm 90 (Fig. 4) which is keyed to the shaft 40 and has limited axial sliding adjustment thereon. The worm 90 drives a worm gear 91, which in turn rotates a gear 91a which engages a gear 92 on the input hub 62a of the second drum shaft 54. The output hub and disc 66a on the shaft 54 (Fig. 1) has a gear 93 which engages the gear 71 on the output shaft 15.

It will be understood that all of the parts mounted on the shaft 54 are duplicates of the parts previously described in connection with the shaft 10, except that the spiral bands are oppositely connected, so that rotation of the shaft 10 in one direction will tighten the band 60 (Fig. 1), while rotation of the shaft 54 in the opposite direction will tighten the band 60a.

The control shaft 40 has a pin-and-keyway connection for rotating the worm 90, which worm is mounted in an auxiliary bearing member 95 which is threaded to an adjusting screw 96 having a hand-knob 97. By turning the knob 97 and screw 96, the worm 90 may be relatively axially adjusted on the control shaft 40, and tightness or looseness of the spiral bands 60 and 60a may be correspondingly adjusted.

Having described the details of construction of my improved power actuator, the operation and utility thereof will now be explained.

Under normal conditions, the power or input shaft 10 will be continuously rotated and will continuously rotate the second drum shaft 54 and the drums 55 and 55a. The two drum shafts and drums are however rotated in opposite directions. The output shaft 15 remains stationary so long as the control shaft 40 also remains stationary.

If the shaft 40 is turned anti-clockwise by the control motor M', the worm 80 will act through the described gear train to turn the hub 62 and the attached end of the band 60 in an anti-clockwise direction, thus tightening the band on the rotating drum 55.

The output shaft 15 will then come to rest in its new position, which corresponds to the angular movement given to the control shaft 40 by the control motor M' as called for by the pattern plate P.

During this operation, the parts associated with the second drum shaft 54 and the second drum 55a will be correspondingly and oppositely rotated, but such opposite rotation will not tighten the band 60a on the drum 55a, so that the drum shaft 54 and drum 55a will be inoperative to move the output shaft 15 or to retard movement thereof. If, however, the control motor M' turns the control shaft 40 in a clockwise direction, conditions will be reversed, the band 60a will grip the drum 55a, and the output shaft 15 will be turned clockwise to correspond to the clockwise movement of the control shaft 40.

In the use of my improved power actuator, the power for turning or adjusting the output shaft 15 is derived directly from the power shaft 10, and the control shaft 40 acts only to connect the selected drum shaft to the output shaft 15 for such interval as is indicated by the angular control movement of the shaft 40. Consequently, the shaft 40 can be turned very easily. The reversible control motor M' may be of such relatively small size that it can be easily put in operation by the pattern plate P and the detector 25.

The cage sleeves 74 act to limit the clearance between the drums and the bands and to equalize the clearance along the length of each band as the band is loosened. If the bands are of spring steel, the cages may sometimes be omitted. The drums are preferably hardened and polished.

The knob 97 may be turned to slide the worm 90 and to thereby tighten or loosen the spiral bands.

By a simple change in the type of gearing, the angular relation of the input, output and control shafts may be varied.

*Operation*

Figure 7:
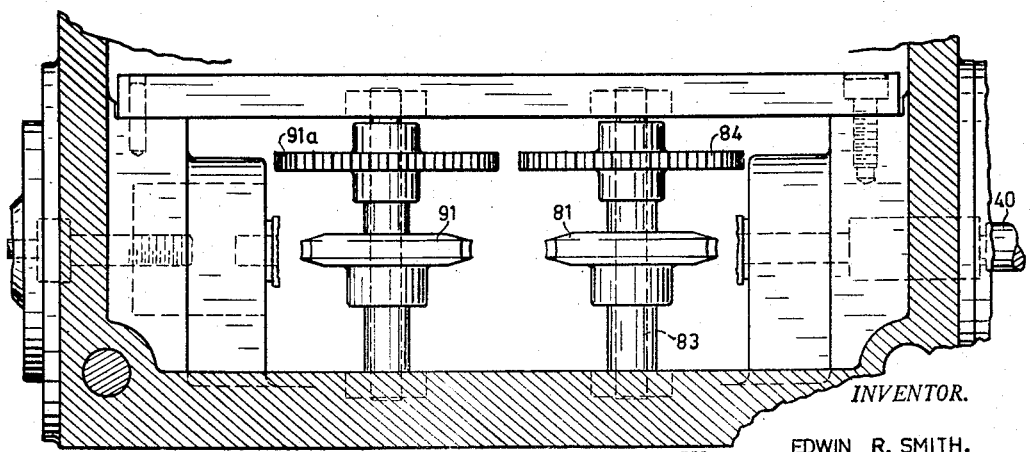
Fig. 7 is a plan view of certain parts, looking in the direction of the arrow 7 in Fig. 4.

The method of operation of the invention may be briefly described as follows:

Referring to Fig. 4, the worm 90 engages the gear 91 which is pinned to the same shaft as the gear 91a (Fig. 7). The gear 91a meshes with the gear 92 and the gear 92 (Fig. 5) is screwed to the hub 62a. This hub has an ear to which one end of the band 60a is fastened. The band 60a (Fig. 1) is wrapped around the drum 55a and the other end of the band 60a is attached to an ear on the hub 66a.

The gear 93 is integral with the hub 66a and meshes with the gear 71 on the output shaft 15. The gear 71 meshes with the gear 70, which is integral with the hub 66 and which hub has a projecting ear 65. One end of the band 60 is attached to the ear 65 by screws 64. The opposite end of the band 60 is attached by a screw 61 to an ear on the hub 62.

The gear 85 is attached to the hub 62 (Fig. 4) and meshes with the gear 84 (Fig. 7) which is pinned to the shaft 83 to which the worm gear 81 is also pinned. The worm gear 81 (Fig. 4) meshes with the worm 80 which is restrained from axial motion by suitable thrust bearings.

Assuming that the mechanism is at rest and with all power off, the worm 80 (Fig. 4) has no tendency to turn, since shaft 40 is now stationary. The worm 80 cannot be turned by any action of the worm gear 81, as the helix angle of the worm 80 is a locking angle.

If, now, the knob 91 is turned counter-clockwise, this will cause the right-hand screw 96 to exert a thrust on the movable housing 95, and will move the housing toward the right. This will directly turn the worm gear 91 and the associated gear 91a counter-clockwise. Since the band 60a is wound clockwise, this will tighten the band 60a.

The opposite end of the band 60a is attached to the hub 66a (Fig. 1) of the gear 93. Tightening of the band 60a will thus turn the hub 66a and the gear 93 clockwise. The gear 93 meshes with the gear 71 and revolves the gear 71 counter-clockwise. This causes the gear 70 and associated hub 66 to be turned clockwise.

At this time, the worm 80, worm gear 81, gears 84 and 95 and associated hub 62 are all stationary. One end of the band 60 is thus held fixed, and the other end is attached to the hub 66. When this hub is revolved clockwise as above described, the band 60 will be tightened.

The degree of tightening depends on the amount of axial motion of the worm 90, and the relative tightening of the bands 60 and 60a depends on the elastic properties of the two bands. These bands are geometrically identical but are wound of opposite hand. The elastic properties are the same, and thus the degree of adjustment of the two bands will be equalized.

For adjustment of the bands to a looser setting, the equalizing will be the same but in reverse direction.

Having thus described my invention and the advantages thereof, I do not wish to be limited to the details herein disclosed, otherwise than as set forth in the claim, but what I claim is:

In a power actuator having continuously but oppositely rotated power shafts, drums fixed on said shafts, an input hub loosely mounted on each power shaft and adjacent but separate from each drum, an output member loosely mounted on each power shaft, and a spiral friction band connected between each input hub and its associated output member, that improvement which comprises clutch and clutch-actuating structure having a single control shaft and a separate and direct gear connection from said single control shaft to each input hub, and each gear connection comprising a worm on said control shaft, which worms are both of the same hand, a separate worm gear engaged by each worm, and positive gearing between said worm gears and said input hubs, one of said worms being axially slidable on said single control shaft, and means being provided to relatively shift said slidable worm axially along said shaft to vary the axial spacing of said worms and to thereby vary the combined band tension on said drums.

References Cited in the file of this patent

UNITED STATES PATENTS

| | | |
|---|---|---|
| 1,191,893 | Harriman | July 18, 1916 |
| 2,569,585 | Small | Oct. 2, 1951 |